N. SCHENK.
DEMOUNTABLE RIM FOR VEHICLE WHEELS.
APPLICATION FILED AUG. 2, 1913. RENEWED DEC. 4, 1914.
1,128,531.
Patented Feb. 16, 1915.
2 SHEETS—SHEET 1.
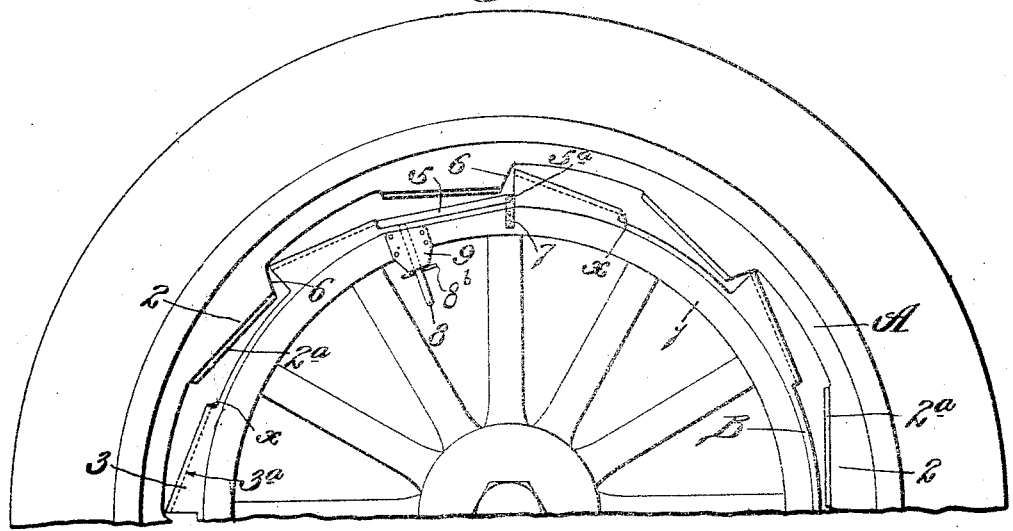

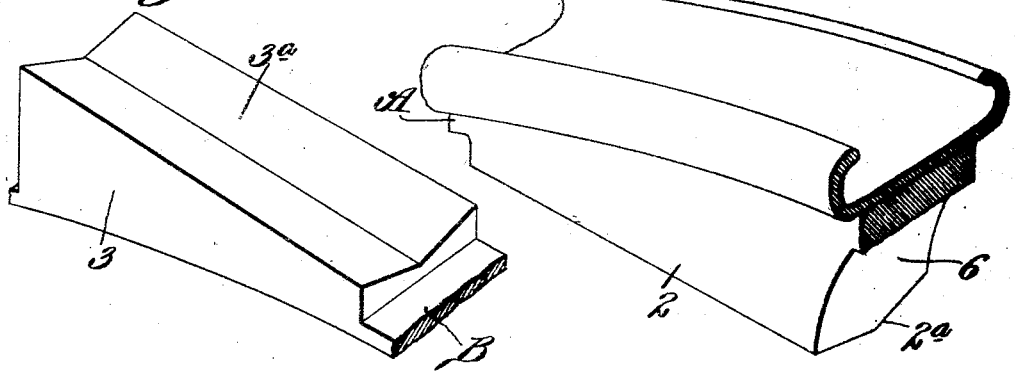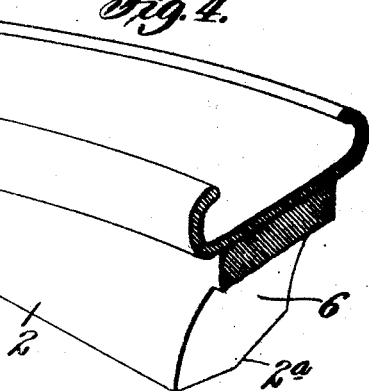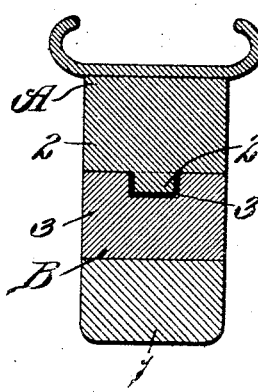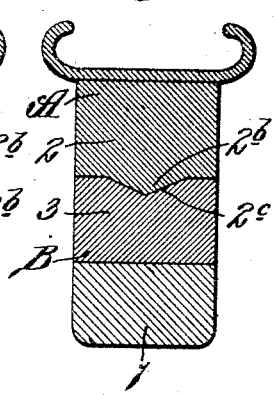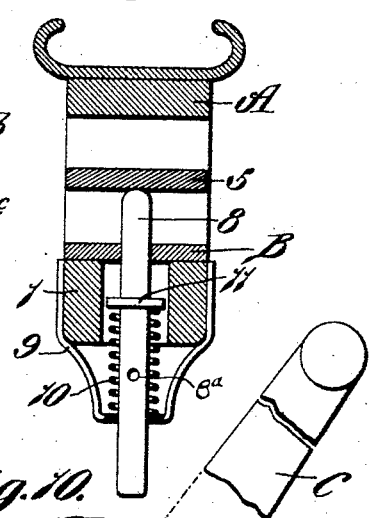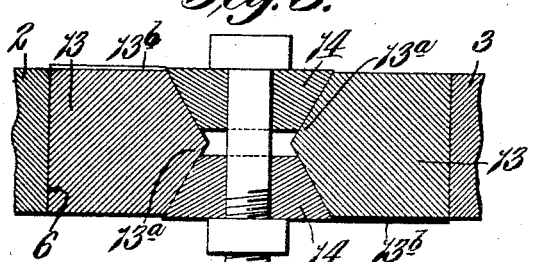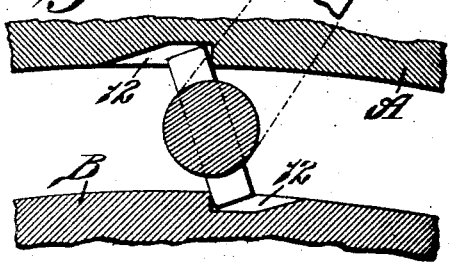

UNITED STATES PATENT OFFICE.

NICHOLAS SCHENK, OF ST. LOUIS, MISSOURI.

DEMOUNTABLE RIM FOR VEHICLE-WHEELS.

1,128,531.  Specification of Letters Patent.  Patented Feb. 16, 1915.

Application filed August 2, 1913, Serial No. 782,619.  Renewed December 4, 1914.  Serial No. 875,486.

*To all whom it may concern:*

Be it known that I, NICHOLAS SCHENK, a citizen of the United States, residing at St. Louis, Missouri, have invented a certain new and useful Improvement in Demountable Rims for Vehicle-Wheels, of which the following is a full, clear, and exact description, such as will enable others skilled in the art to which it appertains to make and use the same.

This invention relates to demountable rims for vehicle wheels, and particularly to demountable rims of the type in which the permanent rim on the felly of the wheel and the demountable rim are provided with coöperating interlocking portions that are brought into engagement with each other by rotating the demountable rim circumferentially of the wheel. The demountable rims of the type mentioned which have heretofore been experimented with, usually comprised wedge-shaped interlocking portions that became wedged so tightly together after the rim had been in use for a short period that a great deal of trouble and labor was involved in removing the demountable rim. The cost of manufacturing such rims was also very high owing to the fact that the coöperating wedge-shaped portions on the fixed rim and on the demountable rim were provided with perfectly true bearing surfaces that necessitated a great deal of lathe work in manufacturing the rims. And still another objectionable feature of such structures was the complicated locking devices that were generally employed to lock the demountable rim in operative position. Consequently, demountable rims of the type referred to have not gone into general use on account of the high cost of manufacturing same and the trouble experienced in disengaging the coöperating wedge-shaped portions on the demountable rim and fixed rim during the operation of removing the demountable rim.

The main object of my invention is to provide a demountable rim of the general type above-mentioned that can be manufactured at a low cost and which is so designed that the demountable rim can be removed quickly and easily from the fixed rim on the felly of the wheel.

Another object is to provide a demountable rim of the character mentioned that comprises an efficient locking means of simple and novel construction for holding the demountable rim securely on the fixed rim and preventing it from working loose.

Other objects and desirable features of my invention will be hereinafter pointed out.

Figure 1 of the drawings is a side elevational view of a portion of a vehicle wheel equipped with a demountable rim constructed in accordance with my invention, illustrating the demountable rim in position preparatory to moving it circumferentially into operative position on the fixed rim; Fig. 2 is a side elevational view of the wheel shown in Fig. 1 with the demountable rim in operative position; Fig. 3 is a perspective view of one of the centering devices or blocks on the fixed rim that coöperates with a similar device on the demountable rim to center the demountable rim and prevent it from moving laterally with relation to the fixed rim; Fig. 4 is a perspective view of the device or block on the demountable rim that coöperates with the block shown in Fig. 3; Fig. 5 is a cross sectional view illustrating another way of forming the interlocking blocks on the fixed rim and demountable rim; Fig. 6 is a cross sectional view illustrating still another way of forming said blocks; Fig. 7 is an enlarged cross sectional view taken on the line 7—7 of Fig. 2; Fig. 8 is an enlarged horizontal sectional view taken on the line 8—8 of Fig. 2; Fig. 9 is a cross sectional view taken on the line 9—9 of Fig. 2; and Fig. 10 is an enlarged vertical sectional view taken through portions of the fixed rim and demountable rim to illustrate the method of using the tool that is employed for moving the demountable rim circumferentially of the fixed rim during the operation of removing the demountable rim.

Referring to Figs. 1 and 2 of the drawings which illustrate the preferred form of my invention, A designates a demountable rim provided with any suitable means for securing a pneumatic tire to same, and B designates a fixed rim that is adapted to be permanently connected to the felly 1 of a vehicle wheel, although it is immaterial so far as my invention is concerned whether the fixed rim B constitutes the felly of the wheel or is formed by a separate member that is connected to the felly of the wheel. The demountable rim A is provided on its inner surface with a plurality of devices 2 that coöperate with devices 3 on the fixed rim B so as to center the demountable rim and prevent it from moving laterally with relation to the fixed rim B, said devices 2 and 3 preferably consisting of blocks of metal spaced at suitable points around the rims that carry same, and being so proportioned that they are of slightly less length than the length of the spaces between the blocks. The blocks 3 on the fixed rim B are provided with inclined faces that coöperate with oppositely inclined faces on the blocks 2 of the demountable rim A, said coöperating inclined faces having a comparatively steep pitch, or, in other words, having a sharp angle or bevel so as to overcome the tendency for them to become wedged tightly together as would be apt to occur if they were provided with coöperating faces that had only a slight inclination or bevel. Another advantage of a construction of the character above-described is that a slight circumferential movement of the demountable rim A to the right, looking at Fig. 2, is sufficient to completely disengage the blocks 2 on the rim A from the blocks 3 on the fixed rim B. I prefer to have the top faces of the blocks 3 incline outwardly from the front ends $x$ of said blocks so that the rotary movement of the wheel will tend to keep the blocks 2 and 3 in engagement with each other, the arrow in Fig. 2 indicating the direction of rotation of the wheel. The blocks 2 and 3 center the demountable rim A with respect to the fixed rim B, and in order to prevent said demountable rim from moving laterally with relation to said fixed rim, I have provided the blocks 2 with substantially inverted V-shaped ribs $2^a$, as shown in Fig. 4, that fit in substantially V-shaped grooves $3^a$ in the blocks 3, as shown in Fig. 3, said ribs and grooves commencing at the side edges of said blocks and terminating at the longitudinal centers of same and being of the same cross sectional area or shape throughout their entire length. Instead of providing said blocks with coöperating ribs and grooves that extend the entire length of the blocks, the blocks 2 could be provided with pins $2^b$ that enter slots or recesses $3^b$ in the blocks 3 when the demountable rim A is arranged in operative position, as shown in Fig. 5. Another slight modification is shown in Fig. 6 wherein the inverted V-shaped ribs $2^c$ on the blocks 2 and the coöperating V-shaped grooves $3^c$ in the blocks 3 are formed only at the centers of said blocks instead of extending clear across the faces of said blocks, thus leaving flat inclined surfaces along the sides of said ribs and grooves. In both the forms of my invention shown in Figs. 3 and 4 and in Fig. 6, however, the coöperating V-shaped ribs and grooves are not tapered inwardly from the sides toward the center line of the blocks; or, in other words, are not wedge-shaped in plan. Consequently, there is very little tendency for said ribs to stick or become wedged so tightly in the grooves that the demountable rim cannot be removed easily, and, furthermore, such a structure can be manufactured cheaply in view of the fact that the grooves can be planed out with a V-shaped cutter and the ribs can also be planed off easily owing to the fact that they are of the same cross sectional shape throughout their entire length. After the demountable rim has been slipped over the fixed rim and moved circumferentially of same in a direction opposite to that indicated by the arrow in Fig. 2 so as to cause the blocks 2 and 3 to engage each other. it will be impossible for the demountable rim to move laterally with relation to the fixed rim. Circumferential movement of the demountable rim A to the left, looking at Fig. 2, is prevented on account of the shape of the coöperating faces on said blocks, and circumferential movement of said demountable rim to the right, looking at Fig. 2, is prevented by a locking means of novel construction which I will now describe. One or more pivotally mounted levers 5 are secured to the fixed rim B in such a manner that the free ends of same will bear against cam faces 6 on the front ends of one or more of the blocks 2 on the demountable rim, as shown in Fig. 2, said levers 5 being arranged in the spaces between the blocks 3 on the fixed rim. The lever or levers 5 may be connected to the fixed rim in any suitable way without departing from the spirit of my invention. In the embodiment of my invention herein shown the front end of the lever 5 is pivoted at $5^a$ to clips 7 on the fixed rim and the cam face 6 on the block 2 with which the rear end of said lever coöperates is so formed that the rear end of the lever 5 will press tightly against same when the rear end of said lever moves outwardly. A resilient means, preferably a spring-actuated plunger 8, is employed for exerting outward pressure on the free end of the lever 5 so as to always hold said lever tightly against the block 2 and thus compensate or provide for any stretch in the demountable rim A. In other words, if the demountable rim should stretch, this will not cause the locking lever 5 to become useless or fail to constantly exert pressure on the block with which it coöperates and thus hold the blocks on the demountable rim in snug engagement with the blocks on the fixed rim because the plunger 8 always exerts outward pressure on the free end of the lever 5, and the block against which the free end of said lever bears is provided with a cam face 6 that compensates for any slight circumferential movement or stretching of the demountable rim in a direction opposite to that indicated by the arrow in Fig. 2. The plunger 8 herein shown is guided by the fixed rim B and by a bracket 9 secured to the felly of the wheel, and the spring 10, which acts on said plunger, is arranged between the cross-piece of said bracket and a collar 11 on said plunger, as shown in Fig. 7. Whenever it is desired to release the demountable rim the free end of the lever 5 is pressed downwardly below the bottom face of the block 2, and a pin 8b, shown in Fig. 1, is inserted in a hole 8a in the plunger, shown in Fig. 7, so as to act as a stop that bears against the underside of the cross-piece of the bracket 9 to hold the plunger retracted or in its inoperative position. In order to facilitate the removal of the demountable rim, I have formed notches 12 in the demountable rim and in the fixed rim, in the spaces between the blocks on said rims, so that a suitable tool C of any preferred construction can be engaged with said notches, as shown in Fig. 10, and used as a lever to move the demountable rim circumferentially of the fixed rim so as to disengage the coöperating blocks on said rims.

In practice I prefer to use an auxiliary locking device so as to eliminate the possibility of accident in case the locking lever 5 should break. Said auxiliary locking device is of novel construction and comprises two members 13 adapted to be arranged in one of the spaces formed between the coöperating blocks on the two rims, and a means for expanding the members 13 or forcing them apart so that one member will exert pressure on the front end of one of the blocks 2 in one direction and the other member will exert pressure on the rear end of the adjacent block 3 in the opposite direction, as shown in Fig. 2. The inner ends 13a of the members 13 are pointed or inverted V-shape, as shown in Fig. 8, and the means that I prefer to use for expanding said members or moving them in opposite directions consists of two wedges 14 arranged at opposite sides of said members between the pointed ends 13a of same, and a bolt 15 for drawing said wedges together. One of the members 13 is preferably provided at its outer edge with a flange 13b, as shown in Figs. 2 and 9, that bears against one edge of the fixed rim so as to prevent said member from moving transversely of the rim when the bolt 15 is tightened, and the other member 13 is provided with a similar flange 13b that bears against the outer edge of the demountable rim.

A locking device of the construction just described is positive, it is simple to operate, it is absolutely reliable, and in view of the fact that it comprises two members 13 and two wedges for separating said members, it exerts equal and uniform pressure on the two adjacent blocks on the rims with which it coöperates.

Having thus described my invention, what I claim as new and desire to secure by Letters Patent is:

1. In a demountable wheel rim, the combination of a fixed rim provided with spaced blocks whose top faces are inclined abruptly longitudinally of the blocks, a demountable rim provided with spaced blocks whose inner faces are inclined abruptly in the opposite direction, coöperating means on said blocks for preventing said rims from moving laterally with relation to each other, and a movable locking device on one of said rims, a cam surface upon the other rim, said locking device bearing against said cam surface and thus automatically taking up or compensating for any slight circumferential movement or stretching of said demountable rim.

2. In a demountable wheel rim, the combination of a fixed rim provided with spaced blocks whose top faces are inclined abruptly longitudinally of the blocks, a demountable rim provided with spaced blocks whose faces are inclined abruptly in the opposite direction, coöperating V-shaped ribs and grooves on said blocks of the same cross sectional area or shape throughout their entire length for preventing said rims from moving laterally with relation to each other, two separable members interposed between two adjacent blocks on said rims and provided with pointed ends, wedges interposed between the pointed ends of said members, means for drawing said wedges together, and means on said members for preventing them from moving transversely of said rims when said wedges are being drawn together.

3. A demountable rim for vehicle wheels comprising a fixed rim, a demountable rim, coöperating devices on said rims that are adapted to be brought into engagement with each other by circumferential movement of said demountable rim in one direction, and a locking device that prevents the demountable rim from moving circumferentially in the opposite direction and which automatically takes up any slight circumferential play that develops between said rims.

4. In a demountable wheel rim, the combination of a fixed rim provided with spaced blocks whose top faces are inclined abruptly longitudinally of the blocks, a demountable rim provided with spaced blocks whose inner faces are inclined abruptly in the opposite direction, a movable locking device on one of said rims, an abutment on the other rim which said locking device engages, one of said elements having an inclined surface, and resilient means that exerts pressure on said locking device.

5. In a wheel, the combination of two rims, one of which is arranged inside of the other, coöperating means on said rims for preventing relative lateral movement and for preventing one rim from moving circumferentially of the other in one direction, and a locking means for preventing said rim from moving circumferentially in the other direction, said locking means being so designed that it automatically takes up or compensates for any slight circumferential movement or stretching of one of said rims.

In testimony whereof I hereunto affix my signature in the presence of two witnesses, this twenty-ninth day of July 1913.

NICHOLAS SCHENK.

Witnesses:
WELLS L. CHURCH,
GEORGE BAKEWELL.